United States Patent [19]

Bowman et al.

[11] Patent Number: 4,560,871

[45] Date of Patent: Dec. 24, 1985

[54] ACTUATOR FOR CONTROL VALVES AND RELATED SYSTEMS

[75] Inventors: Ronald R. Bowman, Boulder Heights; Ingvar E. Sodal, Boulder, both of Colo.

[73] Assignee: Marquest Medical Products, Inc., Englewood, Colo.

[21] Appl. No.: 564,415

[22] Filed: Dec. 22, 1983

[51] Int. Cl.[4] .......................................... B01D 59/44
[52] U.S. Cl. ...................................... 250/288; 251/57
[58] Field of Search .................. 250/281, 288, 289; 251/57

[56] References Cited

U.S. PATENT DOCUMENTS 2,908,290 10/1959 Hamilton-Peters et al. ......... 251/57
3,895,231 7/1975 Sodal et al. ........................... 250/288
4,322,055 3/1982 Baumann .............................. 251/57

FOREIGN PATENT DOCUMENTS 2425599 1/1980 France ................................ 251/129

Primary Examiner—Bruce C. Anderson
Attorney, Agent, or Firm—Sheridan, Ross & McIntosh

[57] ABSTRACT

An actuator system is provided which includes a force transfer element and a force receiving element. A viscous material interconnects the force transfer element and the force receiving element. A workpiece, such as a valve member, is connected to the force receiving element. When a controlled force is applied to the force transfer element, the controlled force and resulting movement are rigidly coupled using the viscous material to the force receiving element so that the workpiece can be moved or otherwise operably controlled. When an uncontrolled force is received by the force transfer element, in which the movement of the force transfer element is slow relative to the deformation of the viscous material, there is no coupling of the uncontrolled force and resulting movement to the workpiece. As a result, the actuator system is able to couple rapid movements using the viscous material while relatively slow movements are not coupled. Uncontrolled forces contemplated by this invention include forces resulting from stress, aging drift, and temperature variations associated with the force transfer element and the force receiving element.

19 Claims, 5 Drawing Figures

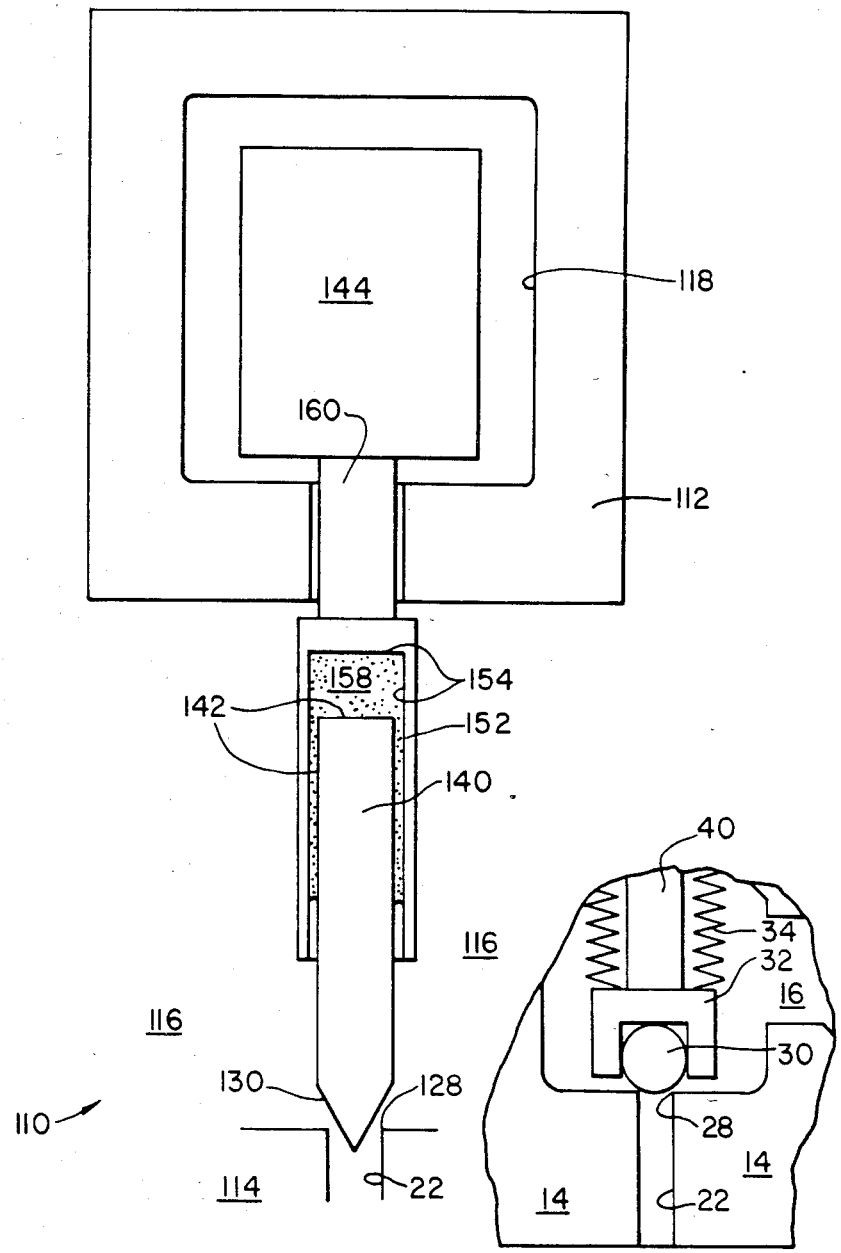

ACTUATOR FOR CONTROL VALVES AND RELATED SYSTEMS

FIELD OF THE INVENTION

This invention relates to an actuator system for a fluid handling control valve system and to methods and systems for using such actuator and valves. More particularly it relates to a stable valve system for controlling the flow of fluids through an opening, which valve system is activated by and in response to controlled rapid actuation, but which is not responsive to slow uncontrolled movement or random actuation.

BACKGROUND OF THE INVENTION

Specialized small valve systems have been developed to control fluid flow to evacuated chambers such as those used with mass spectrometers, vacuum evaporation and coating systems, epitaxial deposition systems, plasma etching installations, ion milling, sputtering systems, ion implantation, gas mixing and the like. Such valve systems have had to meet the special demands of being capable of controlling fluid flow between areas having immense pressure differentials. Additionally, they have usually had to meet the requirements of having very precise actuator mechanisms, or of being very small, or of being both very precise and very small. Efforts to teach gas flow control systems, actuators and valves of this kind, which are especially suited for use with mass spectrometers, are set forth in U.S. Pat. No. 3,895,231 and its divisional U.S. Pat. Nos. 3,926,209 and 4,018,241. These references disclose systems in which fluid flow to an evacuated chamber, and especially in mass spectrometers, is controlled by utilizing a valve in which a tapered needle is positionally adjusted with respect to an inlet opening or valve seat by a piezoelectric ceramic actuator on which the needle is mounted. The piezoelectric ceramic actuator is flexed by the application of electric potential (voltage). In the systems taught by the above U.S. patents, servo-control systems provide for the selection of the amount of electric potential, which in turn controls the amount of piezoelectric ceramic flexing, and the concomitant movement of the valve needle from the valve seat, and therefore the volume of fluid which can flow through the valve. In those systems, the servo-control systems taught are responsive to some condition, such as pressure, within the chamber into which the fluid is being injected.

In practice, such valve systems have usually required quite small openings, say 0.05 microns or less in diameter, and the valve stem movements have been in the micrometer and nanometer range. In such applications, due to the small sizes and tolerances of such valve systems, and also due to the nature and character of the piezoelectric actuator, such valve systems have been difficult to construct accurately. Once constructed such valve systems have been difficult to maintain. More specifically, in order to reliably provide precise small valve movements of, for example, one micrometer or less by conventional means requires tolerances in the machining and in the assembly of the valve parts which are extremely difficult to obtain. Additionally, at such small dimensions, even with almost perfect machining and assembly, after construction of such a valve, drifts can occur in the piezoelectric actuator, stem, or other components of the system such that the position of the valve stem at the valve opening shifts or the closing force of the valve can be seriously modified. Such drifts or shifts can be as large or even much larger than the intended valve movement.

Such drift may be caused by, for example, temperature variations that occur either from time to time or over a relatively extended interval of time. Drift may also be caused by metal creep, or may be due to any of a variety of other physical phenomena.

At the present time, the foregoing and other problems, when not dealt with, result in loss of control and accuracy of such valve systems. When dealt with, such problems require frequent mechanical and biasing adjustments of the valve system, at a great cost in time as well as in money.

SUMMARY OF THE INVENTION

The present invention is directed to a new actuator system and especially to the use of such an actuator system in a valve system for fluid handling. It also relates to methods and systems for using such an actuator system and to such valve systems using such an actuator system. It also relates to techniques for operating valve systems having close mechanical tolerances and/or small dimensions and/or small amounts of movement.

In the practice of the present invention, using the actuator systems of the present invention, devices, such as small valves and the like, may be fabricated utilizing conventional tolerances, which devices will perform in a controlled manner and with accuracy over extended intervals of time and under varying environmental conditions, essentially without the requirement for frequent mechanical and biasing adjustments of the type now required.

In preferred embodiments, the actuator system of the present invention will be used in valve systems which control the passage of fluids through a passageway. In such valve systems a support structure or frame will be provided for the valve system and actuator so that the actuator follower or stem will be operationally located with its nondriven end adjacent to or in contact with the valve seat opening, for example to a passageway. In such preferred embodiments the passageway opening-closing end portion of the valve stem will be substantially aligned with the valve seat, and movable with respect to the valve seat between at least a first position closing the valve seat and a second position away from the valve seat passageway. In preferred embodiments the follower or valve stem will be movable in response to the force transfer surface of the actuating device of the present invention, to a continuously variable number of positions. In some preferred valve system embodiments an additional and separate biasing mechanism is provided which biases the opening-closing end portion of the stem towards a selected normally open or normally closed position with respect to the valve seat passageway.

More specifically, the present invention relates to an improved actuating system in which a follower is adjacent to but separated from the actuating device by viscous material. The actuating system includes an actuating device having a force transfer surface portion, which force transfer surface portion has a normal rest position, but which can be driven and caused to move. The follower portion of the actuating system, which may be a valve stem or a portion of a valve stem, will be adjacent to, but separated from the force transfer surface portion of the actuating device, with viscous material coupling material intermediate and in contact with both the force transfer surface and follower. The viscous material will allow almost immediate and complete transfer of rapid movement and force from the force transfer surface of the actuating device to the follower, but as long as they are not rapid will absorb relatively large drifts and shifts in the actuating device and support structure without causing any substantial shifts in the follower or stem.

The coupling composition will be a viscous material. In some embodiments having the viscous coupling material can have a viscosity in the range of about $10^{-2}$, for example a gas, to about $10^{12}$ centipoise, for example, characteristic of flowable pitch. In most embodiments the viscous coupling material will have a range of about 1 to about $10^{10}$ centipoise, with the preferred range being about $10^3$ to $10^7$ centipoise which is characteristic of many stable siloxane fluids. One specifically preferred viscous material is polydimethyl siloxane having a viscosity of about $10^6$ centipoise. However, in general, any viscous material, mixture of viscous materials, or viscous material including non-viscous filler, which material provides the required properties, may be used in the practice of the present invention.

Where the actuating device includes piezoelectric ceramic material, the movable force transfer surface of the actuating device will be driven by electromotive means operatively associated with the actuating device to drive the movable force transfer surface to at least one position, but more typically to a continuous variety of positions, which will be different from its rest position. Such a piezoelectric system may be a single piezoelectric element, a stack of piezoelectric elements, a bender bimorph, or any other form of piezoelectric ceramic actuator. The actuating device may also be any other suitable mechanism, whether electrical, mechanical or hydraulic, which provides controllable and predictable motion of a force transfer surface away from a rest position. In preferred embodiments the actuating device will be capable of controlled, rapid bidirectional movement.

In preferred valve system embodiments of the present invention the follower will be a substantially linear valve stem, having a first and a second end. The first end of the valve stem will be located adjacent the movable force transfer surface of the actuating device, while the second end of the valve stem will define or be linked to an opening-closing surface portion, as detailed below. The viscous coupling material will be positioned intermediate the movable force transfer surface of the actuating device and the adjacent first end portion of the valve stem. The viscous coupling material will be in intimate and substantially continuous coupling contact with both surfaces. Any movement of the force transfer surface which is fast, relative to the deformation time of the viscous coupling material, will cause the viscous material to transmit substantially all controlled dynamic movement and force from the movable force transfer surface of the actuating device to the first adjacent surface of the valve stem, and thus move the entire valve stem. However, the same viscous material will transmit substantially no force or movement between the movable surface of the actuating device and the first adjacent end of the valve stem when the movement of the movable force transfer surface is slow relative to the deformation time of the viscous material. Thus, slower variations in the actuating device, variations in any separate actuating device, and variations in any other valve system component, due, for example, to stress, aging drift, and temperature variations will not be transferred from the force transfer surface through the viscous coupling material to the follower or stem. As a result, devices of the present invention will be expected to perform over extended intervals and under varying environmental conditions, without the requirement for mechanical and biasing adjustments of the type now required.

The present invention will also provide a combined valve system and passageway, wherein the valve system will control the flow of fluid between an inlet and an outlet of such a passageway, and in which a valve stem seat is present at the inlet of the passageway. In such a structure the valve system will have a valve stem having a closure surface, which closure surface will be substantially aligned with the valve seating opening, and which stem closure surface is movable with respect to the valve seating opening from a first position abutting and closing the valve seating opening to one or more positions spaced from the valve seat opening. As described above, an actuating device coupled to the valve stem and having a movable force transfer surface for transferring movement to the stem to move its closure surface towards at least one second (opened) position will be provided. The combined valve system and valve seating structure will include a viscous force transfer material in intimate contact with both the movable surface of the actuating component and the stem. The valve system will be actuable from its normally closed rest state to an open actuated state in which the movable surface of the actuating device will cause movement of the stem by transmitting dynamic force through the intermediate viscous coupling material.

In the practice of the present invention utilizing the disclosed actuating system, once the actuating device is activated in a manner to move the force transfer surface away from the follower, the follower will tend to move in the same direction as the force transfer surface due to the connection provided between them by the viscous coupling material. However, since all or a substantial amount of the transmitted force and movement of the follower is due to the viscosity of the viscous force transfer material, and since this viscous force is maintained only by the deformation rate of the viscous material, once the movement of the force transfer surface has stopped, the follower, if normally so biased, will slowly move away from the stationary force transfer surface. For example, if the follower is a valve stem, the valve will resume its normally closed or normally open position. Therefore, for the actuator to be useful in the sense of being more than a "one shot" operation, the actuator must, from time to time, be deactivated so that the force transfer surface and the follower are repositioned in close relationship and the viscous force transfer material can relax and return to an unactivated rest position. After this relaxation period, during which any drifts in the dimensions or locations of the various components of the actuation system can be accommodated, the actuator system can be actuated again. Thus, over an indefinite time period, the viscous-material-filled gap between the force transfer surface and the follower can absorb relatively large shifts or drifts while still accurately transmitting the relatively small rapid movements of the actuator device.

In practice, a valve including the actuator system of the present invention can be, for example, operated with rapidly repeating cycles which open and then close the valve to provide a desired fluid flow through the valve system passageway. Or, as another example, a valve system passageway may be opened long enough to provide some desired amount of fluid flow and then closed until such time as more flow is desired.

With suitable choice of viscous material and gap dimensions, the actuation time of the valve before, say, ninety percent (90%) of the initial stem movement has been lost due to viscous creep can be from much less than a millisecond to 1000 seconds or more, if practical. Periods of actuation will be a function of the viscosity of the material, the direction of deformation. If nearly complete relaxation of the material is required by the particular application, then the off time of the valve must be comparable to these times.

In some instances it may be desirable to minimize the time required for relaxation, for example where it is desired to maximize valve fluid throughout for a given maximum available actuator movement. For such an application, it may be advantageous to use a viscous material that varies its viscosity with time or as a function of applied energy. Using such a material, during the relaxation period the viscosity of the material could be increased or reduced, for example by applying an electric field, to vary the relaxation time. However, in most instances successful actuator or valve operation will not require complete relaxation of the viscous material during the off period, as in some applications only a partial relaxation may suffice.

These and other objects of the present invention will become apparent to those skilled in the art from the following detailed description, showing the novel construction, combination, and arrangement of parts as herein described, and more particularly defined by the appended claims, it being understood that such changes in the precise embodiments of the herein disclosed invention are meant to be included as come within the scope of the claims except insofar as precluded by the prior art.

For a fuller understanding of the nature and objects of the invention, reference should be had to the following detailed description taken in connection with the accompanying drawing.

BRIEF DESCRIPTION OF THE DRAWINGS

The accompanying drawings illustrate complete preferred embodiments of the present invention according to the best mode presently conceived for the practical application of the principles thereof, and in which:

FIG. 2 is a broken-away, schematic cross-sectional portrayal of the valve closure portion and valve seat of FIG. 1 in an "open" position;

FIG. 3 is a schematic cross-sectional portrayal of a modified valve system structure according to the present invention.

DETAILED DESCRIPTION OF THE INVENTION

Figure 1:
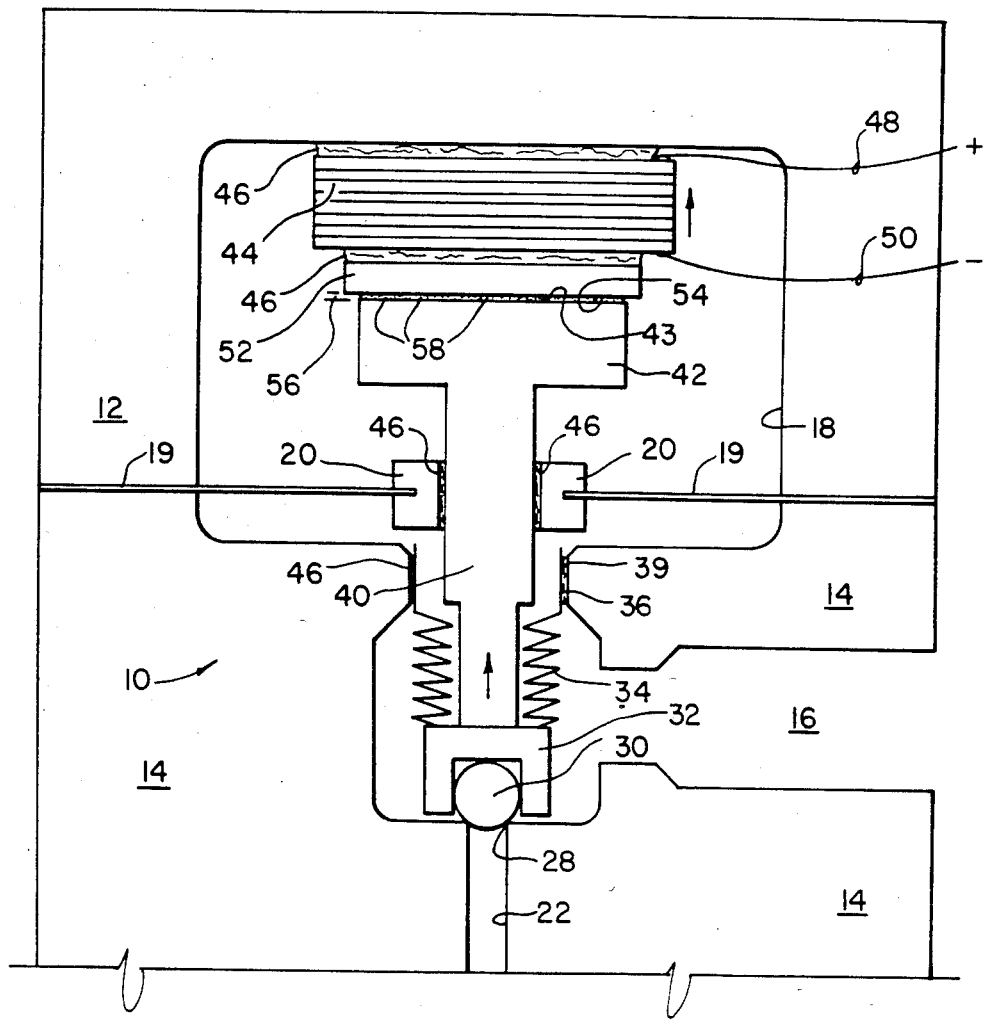
FIG. 1 is a schematic cross-sectional portrayal of a valve system structure in a mass spectrometer including the actuating system of the present invention, with the valve in a "closed" position.

Referring to FIG. 1, a simplified schematic cross-sectional representation of a controlled fluid passageway in a mass spectrometer is set forth, including a typical actuating system in conjunction with a valve system which may be produced in accordance with the instant invention. The system of interest 10 will include upper support structure 12 and lower support structure 14. Lower support structure 14 defines fluid duct area 16 within itself. Upper support structure 12 defines actuator receiving chamber 18 within itself. Chamber 18 will be remotely positioned from duct 16. Secured between upper support 12 and lower support 14 will be flexible ring diaphragm 19, including a central opening which will support cylindrical open bushing 20.

Support structure 14 will support and define cylindrical passageway 22 which will provide an opening therethrough to provide a path for fluids to pass to or from duct 16, as detailed below. The top portion of passageway 22 which will be in contact with duct area 16 will provide an opening or "valve seat" 28 for control by the valve system of the present invention, as hereinafter explained.

Valve seat 28 will be selectively closed and opened by closure component 30. In the illustrated embodiment of FIG. 1, closure component 30 is presented as a ball or sphere which will in turn be secured within socket 32 coupled to hollow enclosing biasing structure 34. In the embodiment shown in FIG. 1, biasing structure 34 will be a closed, continuous, substantially cylindrical spring, having the form of a bellows. Upper cylindrical portion 36 of biasing structure 34 will be positioned and fixed, for example by adhesive 46 within a corresponding cylindrical opening 39 formed through support structure 14 and extending between duct 16 and actuator chamber 18. Biasing structure 34 and connected spherical member 30 will both be co-axially aligned with the central axis of passageway 22, and biasing structure 34 will serve to assert a continuous downward spring bias which will assure the seating of sphere 30 against valve seat 28 of passageway 22 to provide a normally closed passageway configuration, as shown in FIG. 1.

Bellows structure 34 will also surround valve stem component 40. The lower end of stem 40 will be continuously coupled to socket 32, while bellows structure 34 is sealed against the upper surface portion of socket 32. Stem 40 will extend upwardly through upper cylindrical portion 36 of biasing member 34 into actuator chamber 18. In the preferred embodiment, the upper portion of stem 40 within chamber 18 will be configured to provide an enlarged upper force transfer surface portion 42 having a force receiving surface 43.

Also located within chamber 18 will be an actuating device 44. As represented in FIG. 1 actuator device 44 is a stack of piezoceramic crystal elements. Such a piezoelectric stack will be formed generally as a lamination of a plurality of thin piezoelectric disk elements, mounted to the roof of chamber 18, for example using an adhesive 46. Electrical leads 48 and 50 are shown coupled to the piezoelectric stack or actuator device 44 and, upon the application of an appropriate electrical signal, stack 44 will be actuated to move or be driven either upwardly, in the embodiment shown in FIG. 1, or with appropriate adjustments, downwardly. Additionally, the amplitude of flexure of stack 44 will be accurately controlled by the strength of the applied electrical signal (voltage), while the rate of the movement will be controlled by the rate of change of the electrical signal. In preferred embodiments such control will be provided by a servo feedback system of the type disclosed and detailed in U.S. Pat. Nos. 3,895,231;

3,926,209 and 4,018,241; all of which are incorporated herein by reference, as though set forth in their entirety.

Attached to the lowermost surface of stack 44 will be stiffener 52, which will provide a planar force transfer surface 54 which will be positioned closely adjacent to, but spaced from upper force transfer surface 43 of head component 42 of stem 40. Thus, a gap 56 will be defined between force transfer surface 54 of stiffener element 52 and upper force receiving surface 43 of stem 40. Within gap 56 there will be located a viscous-coupling-force-transfer-material 58. Viscous-coupling-material 58 will not transmit slow movement between elements 42 and 52. However, when piezoceramic stack 44 will be electrically actuated so as to cause rapid, dynamically activated movement of element 52, then the forces of movement of surface 54 of element 52 will be instantaneously, and substantially completely transmitted through viscous coupling material 58 to force receiving surface 43 of force transfer element 42 to stem 40. It will thus be noted that while forces due to controlled rapid excitation and consequent movement of force transfer element 52 of actuator device element 44 impart motive force to stem component 40 through viscous coupling material 54, viscous material 58 will accommodate slow variations in the width of gap 56 without transmitting any substantial force or movement to force transfer surface 43 of stem 40. Thus, shifts or drifts in the actuator system due to processes which cause slow movement, such as aging or temperature will be absorbed by viscous material 58 and will not cause movement of stem 40 or opening of valve seat 28.

In the normal embodiment shown by FIG. 1, sphere 30 is resident and biased by bellows 34 within valve seat 28 to provide a normally closed situation between passageway 22 and duct 16. When actuated, piezoelectric stack 44 will move rapidly upward, moving stiffener 52 with it so as to apply movement to viscous force transfer material 58, which will in turn cause stem 40, socket 32 and sphere 30 to move upward to disengage sphere 30 from valve seat 28, as shown in FIG. 2. This will allow fluids to travel between duct 16 and passageway 22. The designation of outlet and inlet ducts respectively at 16 and 22 may be considered somewhat arbitrary, as their functions can be easily reversed.

Referring now to FIG. 3, a simplified schematic cross-sectional representation of a controlled fluid passageway 122, is set forth, including a modified valve system which may be produced in accordance with the instant invention. The entire system 110 will include a valve and actuator support structure 112 and passageway structure 114, defining duct area 116 between them. Additionally, support structure 112 defines actuator chamber 118. Support structure 114 will support and define cylindrical passageway 122 which will provide an opening therethrough to provide a path for fluids to pass to or from duct 116. The top portion of passageway 122 which will be in contact with duct area 116 will provide an opening or "valve seat" 128 for control by the valve system of this embodiment.

Valve seat 128 will be selectively closed and opened by the operation of stem component 140. In the illustrated embodiment of FIG. 3, closure component 140 will terminate in a needle tip 130 which will, in turn, be secured within cylindrical socket 152. Closure component 140 will be coaxially aligned with the central axis of passageway 122, to provide a normally open, but closable, passageway configuration.

In the embodiment of FIG. 3, an additional stem portion 160 will be connected to socket 152 and extend within chamber 118. The inner surface of socket 152 will define a force transfer surface portion 154.

Also located within chamber 118 will be an actuating device 144. As represented in FIG. 3, actuator device 144 may be any controllable electrical, mechanical or hydraulic actuating device. The amplitude of flexure of actuating device 144 will be accurately controlled by the system. Attached to the lowermost surface of element 144 will be stem portion 160, to which, in turn, will be connected socket 152 having force transfer surface 154. Force transfer surface 154 will be positioned around and closely adjacent to but spaced from force transfer surfaces 142 of cylindrical stem component 140. Thus, a cylindrical gap will be defined between force transfer surface 154 of socket 152 and surface 142 of stem 140. Within that cylindrical gap there will be located a viscous coupling material 158. Viscous coupling material 158 will be selected so that it does not transmit forces or movement between elements 140 and 152 when element 152 coupled to actuating device 144 is normally at rest, that is when element 144 is not being rapidly actuated. However, when actuating device 144 will be actuated so as to cause rapid, dynamically activated movement of element 152, then the forces of movement of surface 154 of element 152 will be instantaneously and substantially completely transmitted through viscous coupling material 154 to force transfer element 142 of stem 140. It will thus be noted that while forces due to controlled excitation and consequent movement of element 145 of actuator element 144 impart motive force to stem component 140 through viscous coupling material 154, that during rest intervals, material 154 accommodates variations in the width of gap 158 without transmitting any substantial force or movement to force transfer surface 142 of stem 140. Thus, movement in the system due to aging, temperature, shift or drift will not cause movement of stem 140 or opening of valve seat 128.

Figure 4:
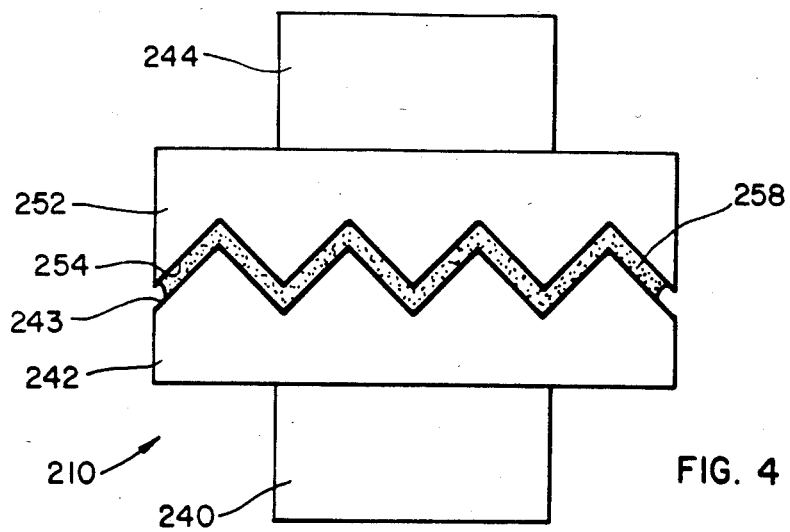
FIGS. 4 and 5 are schematic portrayals of modified actuating systems in use with a workpiece other than a valve, according to the present invention.
Figure 5:
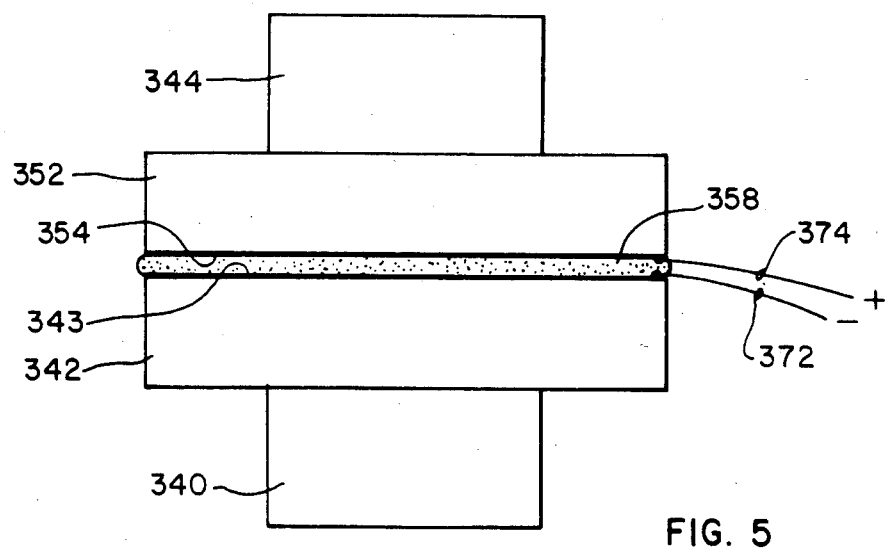

Now, referring to FIGS. 4 and 5, modified actuator systems in accordance with the present invention are shown schematically for use with workpieces and other than valve stems and valve systems. In FIG. 4 the system, generally 210, includes an actuator device or drive 244, which may be a piezoelectric device, an electronic, mechanical or hydraulic system capable of providing rapid, controlled movement to a force transfer element 252 having force transfer surface 254. Prezoelectric devices of choice include prezoelectric stacks, bender bimorphs, single component cylinders, and single component disks. In this embodiment, force transfer surface 254 is irregular, being a series of teeth or cones on its surface. Opposed to, but spaced from force transfer element 252 is force receiving follower 242 having a force receiving surface 243. Force receiving surface 243 is also irregular, being designed to be substantially complementary to force transfer surface 254. The gap formed between force transfer surface 254 and force receiving surface is preferably about five mils or less and substantially filled with viscous force transfer material 258. Associated with follower 242 is workpiece 240 which may be a valve stem, an optical element such as a mirror, a hammer, for example, a printer wire, a stylus or any other workpiece element which requires controlled and accurate actuation.

In operation, actuation of driver 244 towards or away from follower 242 will result in substantially simultaneous and similar movement of follower 242 and associate workpiece 240 due to the transfer of force through viscous material 258. The configuration of the force transfer and receiving surfaces 254 and 243 of the system of FIG. 4 assures similar lateral as well as longitudinal movement. However, even in the absence of irregular surfaces, the shear characteristics of viscous material 258 will provide similar lateral movement between force transfer and receiving elements.

In a similar manner, FIG. 5 discloses a system in accordance with the present invention in which the viscous material can be modified electrically. In the system driver 344 and associated force transfer element 352 terminate in force transfer surface 354. Spaced therefrom is force receiving element 342 having force receiving surface 343 and associated with workpiece 340. Force receiving and transfer surfaces 343 and 354 are spaced from one another to define a gap which is substantially filled, or overfilled, with electroviscous material 358. Viscous material will remain in the gap due to surface tension. Surface 343 is conductive and has electric lead 372 associated with it while surface 354 is also conductive and has electric lead 374 associated therewith. This sytem operates in much the same manner as the above described systems, with the exception that by electrification of surfaces 343 and 354, an electric field gradient will be provided in the gap. Such an electric field can alter the viscosity of electroviscous material 358. Increasing or decreasing of viscosity can affect either the efficiency or relaxation characteristics of the system.

It is, therefore, seen that the present invention provides systems in which viscous material is used to couple an actuating device and a follower system. This provides a simple, effective and inexpensive system for providing accurate and controlled positioning of movable elements. The provision of a gap or space between such elements and the use of viscous material in the gap or space can accommodate deviations which could otherwise be critical in the positioning of the driver. In the practice of the present invention, such deviations will not seriously affect the follower as the viscous gap is capable of closing or expanding as required to accommodate variations in the system due to temperature changes, shift or drift.

Since certain changes may be made in the above-described apparatus and method without departing from the scope of the invention herein involved, it is intended that all matter contained in the description thereof or shown in the accompanying drawings shall be interpreted as illustrative and not in a limiting sense.

While the invention has been particularly shown and described with reference to preferred embodiments thereof, it will be understood by those skilled in the art that the foregoing and other modifications or changes in form and details may be made therein without departing from the spirit and scope of the invention as claimed, except as precluded by the prior art.

What is claimed is:

1. A method for controlling the operation of a workpiece, comprising:
   delivering a force to a force transfer element;
   transferring at least a portion of said force to viscous means using said force transfer element;
   rigidly coupling at least a portion of said force to a force receiving element using said viscous means;
   causing said force receving element to react when at least a portion of said force is received by said force receiving element;
   transferring at least a portion of said force from said force receiving element to a workpiece;
   controlling the operation of said workpiece using the reaction of said force receiving element;
   decoupling using said viscous means one of said force transfer element and said force receiving element when an unwanted force is applied to one of said force transfer element and said force receiving element; and
   maintaining said workpiece in the same state during said decoupling step.

2. A method, as claimed in claim 1, wherein:
   said transferring step includes moving said force transfer element to transfer at least a portion of said force to said viscous means.

3. A method, as claimed in claim 1, wherein:
   said unwanted force includes a force due to at least one of the following: stress, aging drift, and temperature variations which are associated with said force transfer element and/or said force receiving element.

4. A method, as claimed in claim 1, wherein:
   said maintaining step includes keeping said workpiece in substantially the same position occupied by said workpiece immediately before said decoupling step.

5. A method for controlling the operation of a workpiece, comprising:
   delivering a controlled force to a force transfer element;
   transferring at least a portion of said controlled force to viscous means using said force transfer element;
   rigidly coupling at least a portion of said controlled force to a force receiving element using said viscous means;
   causing said force receiving element to react when at least a portion of said controlled force is received by said force receiving element;
   transferring at least a portion of said controlled force from said force receiving element to a workpiece;
   controlling the operation of said workpiece using the reaction of said force receiving element; and
   preventing the transfer using said viscous means to said workpiece of a non-controlled force and movement resulting from said non-controlled force.

6. A method, as claimed in claim 5, wherein:
   said workpiece includes a valve and said controlling step includes regulating the opening and closing of said valve.

7. A method, as claimed in claim 5, wherein:
   said step of causing said force receiving element to react includes moving said force receiving element.

8. A method, as claimed in claim 5, wherein:
   said step of preventing includes locating said viscous means in a space that is free of a fixed barrier along at least one portion of said viscous means.

9. A method, as claimed in claim 5, wherein:
   said step of coupling includes using surface tension of said viscous means to substantially contain said viscous means in a desired location.

10. A method, as claimed in claim 5, wherein:
   said preventing step occurs when the movement of said force transfer element is slow relative to the time of deformation of said viscous means.

11. A method, as claimed in claim 5, wherein:
said non-controlled force includes a force generated because of at least one of the following: stress, aging drift, and temperature variations, which are associated with said force transfer element and/or said force receiving element.

12. A method, as claimed in claim 5, wherein:
said controlling step includes moving said workpiece to a desired position.

13. An apparatus for controlling the operation of a reacting member, comprising:
a force transfer element for receiving a controlled force;
a force receiving element in operative association with said force transfer element;
viscous means connecting said force transfer element and said force receiving element together for rigidly coupling at least a portion of said controlled force from said force transfer element to said force receiving element;
a workpiece operatively associated with said force receiving element, the operation of said workpiece being controlled by said force receiving element using at least a portion of said controlled force; and
said viscous means being located in a space in which movement of said viscous means due to a non-controlled force is permitted but said movement is less than the movement necessary to cause a transfer of said non-controlled force and movement resulting from said non-controlled force to said workpiece.

14. An apparatus, as claimed in claim 13, wherein:
said viscous means is open to the ambient.

15. An apparatus, as claimed in claim 13, wherein:
each of said force transfer element and said force receiving element has a number of surfaces including a contacting surface each of which contacts said viscous means, and wherein substantially all of said viscous means contacts said contacting surfaces and substantially none of said viscous means contacts the other surfaces of said force transfer element and said force receiving element.

16. An apparatus, as claimed in claim 13, further including:
means for providing said controlled force.

17. An apparatus, as claimed in claim 16, wherein:
said means for providing a controlled force includes a piezoelectric device.

18. An apparatus, as claimed in claim 13, wherein:
said workpiece includes a valve system.

19. An apparatus, as claimed in claim 18, wherein:
said valve system includes a portion of a mass spectrometer which controls the flow of fluids into an ionization chamber of said mass spectrometer.

* * * * *

UNITED STATES PATENT AND TRADEMARK OFFICE
CERTIFICATE OF CORRECTION

PATENT NO. : 4,560,871
DATED : December 24, 1985
INVENTOR(S) : Ronald R. Bowman and Ingvar E. Sodal It is certified that error appears in the above—identified patent and that said Letters Patent is hereby corrected as shown below:

Column 5, line 13, delete "," and substitute therefor --and--.

Column 7, line 24, delete "54" and substitute therefor --58--.

Column 10, line 1, delete "receving" and substitute therefor --receiving--.

Signed and Sealed this

Twenty-fifth Day of March 1986

[SEAL]

Attest:

DONALD J. QUIGG

Attesting Officer

Commissioner of Patents and Trademarks